(12) United States Patent
Hu et al.

(10) Patent No.: US 11,265,558 B2
(45) Date of Patent: Mar. 1, 2022

(54) CROSS-COMPONENT ADAPTIVE LOOP FILTER

(71) Applicant: QUALCOMM Incorporated, San Diego, CA (US)

(72) Inventors: Nan Hu, San Diego, CA (US); Vadim Seregin, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 17/099,010

(22) Filed: Nov. 16, 2020

(65) Prior Publication Data

US 2021/0160513 A1 May 27, 2021

Related U.S. Application Data

(60) Provisional application No. 62/939,490, filed on Nov. 22, 2019.

(51) Int. Cl.
*H04N 19/00* (2014.01)
*H04N 19/186* (2014.01)
*H04N 19/176* (2014.01)
*H04N 19/117* (2014.01)

(52) U.S. Cl.
CPC ......... *H04N 19/186* (2014.11); *H04N 19/117* (2014.11); *H04N 19/176* (2014.11)

(58) Field of Classification Search
CPC ... H04N 19/186; H04N 19/117; H04N 19/176
See application file for complete search history.

(56) References Cited

U.S. PATENT DOCUMENTS

| 2021/0084340 A1* | 3/2021 | Li  | H04N 19/186 |
| 2021/0092368 A1* | 3/2021 | Du  | H04N 19/186 |
| 2021/0099700 A1* | 4/2021 | Li  | H04N 19/80  |

OTHER PUBLICATIONS

Bross B., et al., "Versatile Video Coding (Draft 6)", JVET-O2001-vE, Joint Video Experts Team (JVET) of ITU-T SG 16 WP 3 and ISO/IEC JTC 1/SC 29/WG 11, 16th Meeting: Geneva, CH, Jul. 3-12, 2019, 455 pages.
Chen C., et al., "Description of Core Experiment 5 (CE5): Cross Component Adaptative Loop Filtering", JVET-P2025-v4, Joint Video Experts Team (JVET) of ITU-T SG 16 WP 3 and ISO/IEC JTC 1/SC 29/WG 11, 16th Meeting: Geneva, CH, Oct. 1-11, 2011, 2019, pp. 1-7.

(Continued)

*Primary Examiner* — Zhihan Zhou
(74) *Attorney, Agent, or Firm* — Shumaker & Sieffert, P.A.

(57) ABSTRACT

In some examples, a method of decoding video data may comprise reconstructing a block of video data comprising chroma samples, applying an adaptive loop filter to the chroma samples, and applying a cross-component adaptive loop filter to the chroma samples. Applying the cross-component adaptive loop filter may include determining an offset, and applying the offset to a particular chroma sample being filtered, wherein the offset is a function of a difference between a collocated luma sample that is collocated with the particular chroma sample being filtered and a plurality of neighboring luma samples that are spatial neighbors to the collocated luma sample.

22 Claims, 10 Drawing Sheets

(56) References Cited

OTHER PUBLICATIONS

Chubach O., et al., "CE5-related: Simplified CCALF", JVET-P0165-v3, Joint Video Experts Team (JVET) of ITU-T SG 16 WP 3 and ISO/IEC JTC 1/SC29/WG 11, 16th Meeting: Geneva, CH, Oct. 1-11, 2019, pp. 1-13.

International Search Report and Written Opinion—PCT/US2020/060889—ISAEPO—Jan. 19, 2021, pp. 1-13.

Misra K., et al., "CE5-Related: Reducing multiplier count in CCALF", Joint Video Experts Team (JVET) of ITU-T SG 16 WP 3 and ISO/IEC14 UTC 1/5C 29/WG 11, 16th Meeting: Geneva, CH, Oct. 1-11, 2019, JVET-P0468-v3, pp. 1-5.

Shen J., et al., "Algorithm Description of Joint Exploration Test Model 1", 1. JVET Meeting, Oct. 19-21, 2015, Geneva (The Joint Video Exploration Team of ISO/IEC JTC1/SC29/WG11 and ITU-T SG.16 WP 3), No. JVET-A1001, Feb. 24, 2016 (Feb. 24, 2016), XP030150000, 27 Pages, URL: http://phenix.int-evry.fr/jvet/.

Hu N., et al., "CE5-related: Reduced Filter Shape for Cross Component Adaptive Loop Filter", JVET-P0558, Joint Video Experts Team (JVET) of ITU-T SG 16 WP 3 and ISO/IEC JTC 1/SC29/WG 11, 16th Meeting, Geneva, CH, Oct. 1-11, 2019, pp. 1-6.

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

Misra (Sharplabs) K., et al., "Cross-Component Adaptive Loop Filter for Chroma", 15th JVET Meeting, Jul. 3, 2019-Jul. 12, 2019, Gothenburg, (The Joint Video Exploration Team of ISO/IEC JTC1/SC29/WG11 and ITU-T SG.16), No. JVET-O0636_r1, Jul. 7, 2019 (Jul. 7, 2019), XP030220123, pp. 1-9, Retrieved from the Internet: URL:http://phenix.int-evry.fr/jvet/doc_end_user/documents/15_Gothenburg/wg11/JVEf-O0636-v2.zip, JVET-O0636_r1.docx [retrieved on Jul. 7, 2019].

U.S. Appl. No. 16/929,868, filed Jul. 15, 2020.

Zhang Z., "CE5-related: On the CC-ALF filtering process", JVET-Q0165-v1, Joint Video Experts Team (JVET) of ITU-T SG 16 WP 3 and ISO/IEC JTC 1/SC 29/WG 11, 17th Meeting: Brussels, BE, Jan. 7-17, 2020, 7 pages.

Bross B., et al., "Versatile Video Coding (Draft 10)", JVET-S2001-vA, Joint Video Experts Team (JVET) of ITU-T SG 16 WP 3 and ISO/IEC JTC 1/SC 29/WG 11, 19th Meeting: by Teleconference, Jun. 22-Jul. 1, 2020, 550 Pages.

* cited by examiner

CROSS-COMPONENT ADAPTIVE LOOP FILTER

This application claims the benefit of U.S. Provisional Application No. 62/939,490, filed Nov. 22, 2019, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for filtering video data (e.g., reconstructed or decoded video data) using a cross-component adaptive loop filter. In some examples, the described filtering techniques may be applied to chroma samples after other filtering is performed on the chroma samples. In particular, in some examples, the cross-component adaptive loop filter may be applied to chroma samples after applying sample adaptive offset (SAO) filtering and after applying adaptive loop filtering. The cross-component adaptive loop filtering may improve video quality by adding high frequency information to a particular chroma sample being filtered based on information in luma samples. Moreover, the techniques of this disclosure may simplify the cross-component adaptive loop filtering by applying a constraint that can simplify filtering computations and possibly reduce the number of filter coefficients needed to perform the cross-component adaptive loop filtering. Thus, in some examples, the techniques may also improve compression by eliminating the need to communicate one or more filter coefficients in the coded bitstream.

In some examples, a method of decoding video data includes reconstructing a block of video data comprising chroma samples, applying an adaptive loop filter to the chroma samples, and applying a cross-component adaptive loop filter to the chroma samples. Applying the cross-component adaptive loop filter may comprise determining an offset, and applying the offset to a particular chroma sample being filtered, wherein the offset is a function of a difference between a collocated luma sample that is collocated with the particular chroma sample being filtered and a plurality of neighboring luma samples that are spatial neighbors to the collocated luma sample. In some examples, determining the offset may comprise determining the offset according to an equation:

$$o = \sum_{i=0 \text{ and } i \neq c}^{N-1} (f_i * (p_i - p_c))$$

where o defines the offset, $f_i$ is a filter coefficient, $p_i$ is a value of a neighboring luma sample, N−1 is a number of taps of the cross-component adaptive loop filter, and $p_c$ is a value of the collocated luma sample.

In some examples, a device may be configured to decode video data. The device may comprise a memory configured to store video data, one or more processors implemented in circuitry and in communication with the memory, an adaptive loop filter, and a cross-component adaptive loop filter. The one or more processors may be configured to reconstruct a block of video data comprising chroma samples, apply the adaptive loop filter to the chroma samples, and apply the cross-component adaptive loop filter to the chroma samples. To apply the cross-component adaptive loop filter, the one or more processors may be configured to determine an offset, and apply the offset to a particular chroma sample being filtered, wherein the offset is a function of a difference between a collocated luma sample that is collocated with the chroma sample being filtered and a plurality of neighboring luma samples that are spatial neighbors to the collocated luma sample.

In some examples, a device for decoding video data may comprise means for reconstructing a block of video data comprising chroma samples, means for applying an adaptive loop filter to the chroma samples, and means for applying a cross-component adaptive loop filter to the chroma samples. Means for applying the cross-component adaptive loop filter may include means for determining an offset, and means for applying the offset to a particular chroma sample being filtered, wherein the offset is a function of a difference between a collocated luma sample that is collocated with the particular chroma sample being filtered and a plurality of neighboring luma samples that are spatial neighbors to the collocated luma sample.

In some examples, this disclosure describes a computer-readable storage medium storing instructions that, when executed, cause one or more processors of a video decoding device to reconstruct a block of video data comprising chroma samples, apply an adaptive loop filter to the chroma samples, and apply a cross-component adaptive loop filter to the chroma samples. To apply the cross-component adaptive loop filter, the instructions may be configured to cause the one or more processors to determine an offset, and apply the offset to a particular chroma sample being filtered, wherein the offset is a function of a difference between a collocated luma sample that is collocated with the particular chroma sample being filtered and a plurality of neighboring luma samples that are spatial neighbors to the collocated luma sample.

The details of one or more examples are set forth in the accompanying drawings and the description below. Other features, objects, and advantages will be apparent from the description, drawings, and claims.

DETAILED DESCRIPTION

This disclosure describes techniques related to video decoding, which may be performed by a video decoding device or by a video encoding device that includes a decoding loop in the video encoding process. In particular, this disclosure describes filtering techniques that may be applied to samples within decoded video blocks to improve video quality. The filtering may include so-called sample adaptive offset (SAO) filtering and adaptive loop filtering by an adaptive loop filter (ALF). In addition, the filtering may include so-called cross component adaptive loop filtering by a cross-component adaptive loop filter (CC-ALF), which filters chroma samples based on associated luma samples. The cross-component adaptive loop filtering may improve video quality by adding high frequency information a particular chroma sample being filtered based on information in luma samples.

In some cases, a CC-ALF may be applied to chroma samples after applying SAO filtering and after applying ALF, although the techniques may also be used without SAO filtering. The techniques of this disclosure may simplify the CC-ALF by applying a constraint that can simplify filtering computations associated with the CC-ALF, and possibly reduce the number of filter coefficients needed to perform the cross-component adaptive loop filtering process. Thus, in some examples, the techniques may also improve compression by eliminating the need to communicate one or more filter coefficients in the coded bitstream.

In some examples, a method of decoding video data may be performed by a video decoding device or by a video encoding device that includes a reconstruction loop as part of the encoding process. The method may include reconstructing a block of video data comprising chroma samples, applying an ALF to the chroma samples, and applying a CC-ALF to the chroma samples. Applying the CC-ALF may comprise determining an offset, and applying the offset to a particular chroma sample being filtered, wherein the offset is a function of a difference between a collocated luma sample that is collocated with the particular chroma sample being filtered and a plurality of neighboring luma samples that are spatial neighbors to the collocated luma sample. In some examples, determining the offset comprises determining the offset according to an equation:

$$o = \sum_{i=0 \text{ and } i \neq c}^{N-1} (f_i * (p_i - pc))$$

where o defines the offset, $f_i$ is a filter coefficient, $p_i$ is a value of a neighboring luma sample, N−1 is a number of taps of the CC-ALF, and $p_c$ is a value of a collocated luma sample. The equation above may be derived by simplifying another equation, such as by applying one or more constraints to a more complex equation that could otherwise be used to define the offset.

Figure 1:
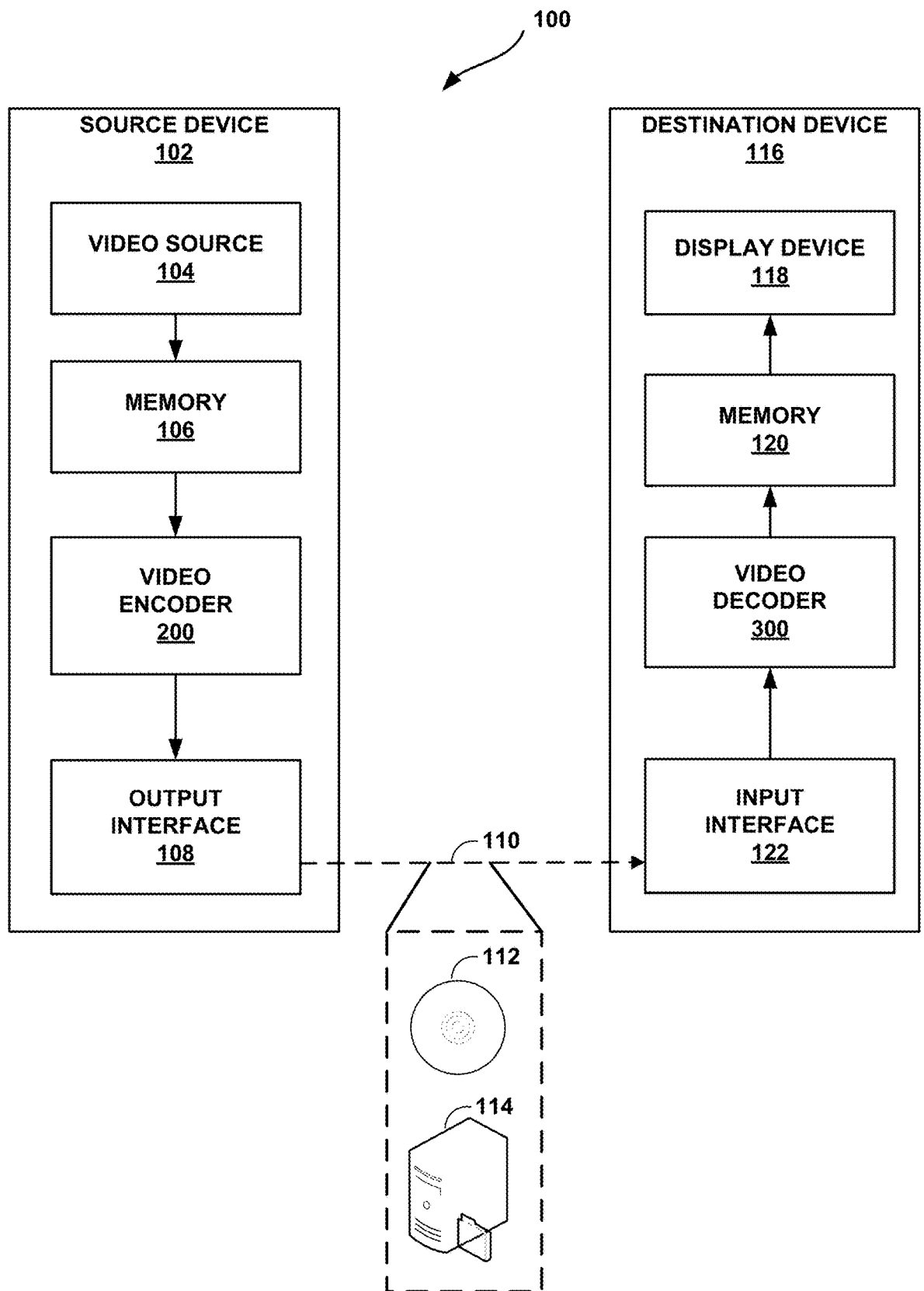
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for filtering video data using a cross-component adaptive loop filter as described herein. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for filtering video data using a cross-component adaptive loop filter as described herein. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples (which may be referred to as components) of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data. Filtering of video data may be performed by video encoder of source device 102 as part of decoding loop used to generate predictive data used in the video encoding process. Filtering may also be performed by video decoder 300 of destination device 116. The filtering may improve video quality, and may include cross-component adaptive loop filtering using one or more techniques of this disclosure.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video encoder 200 and video decoder 300 may be configured to reconstruct a block of video data, and apply a cross-component adaptive loop filter to the reconstructed block of video data. Video encoder 200 and video decoder 300 may, for example, apply the cross-component adaptive loop filter that defines and applies an offset according to the equation: $o=\Sigma_{i=0}^{N-1}(f_i*p_i)=\Sigma_{i=0 \ and \ i \neq c}^{N-1}(f_i*p_i)+f_c*p_c=\Sigma_{i=0 \ and \ i \neq 0}^{N-1}(f_i*p_i)+f_c*p_c+\Sigma_{i=0 \ and \ i \neq c}^{N-1}(f_i*p_c)-\Sigma_{i=0 \ and \ i \neq c}^{N-1}(f_i*p_c)=\Sigma_{i=0 \ and \ i \neq c}^{N-1}(f_i*(p_i-p_c))+p_c*\Sigma_{i=0}^{N-1}f_i$, where o is the output of the cross-component adaptive loop filter, $f_i$ is a filter coefficient, $p_i$ is a value of a neighboring luma sample of the cross-component adaptive loop filter, N is a number of taps of the cross-component adaptive loop filter, $p_c$ is a value of a collocated luma sample, and $f_c$ is a value of a filter coefficient applied to $p_c$.

Moreover, in some examples, video encoder 200 and/or video decoder 300 may be configured to reconstruct a block of video data comprising chroma samples, apply the adaptive loop filter to the chroma samples, and apply the cross-component adaptive loop filter to the chroma samples. To apply the cross-component adaptive loop filter, video encoder 200 and/or video decoder 300 may be configured to determine an offset, and apply the offset to a particular chroma sample being filtered, wherein the offset is a function of a difference between a collocated luma sample that is collocated with the chroma sample being filtered and a plurality of neighboring luma samples that are spatial neighbors to the collocated luma sample. In this way, an offset can be defined and applied to each chroma sample. In some examples, determining the offset for each chroma sample comprises determining the offset according to an equation:

$$o = \sum_{i=0 \text{ and } i \neq c}^{N-1} (f_i * (p_i - p_c))$$

where o defines the offset, $f_i$ is a filter coefficient, $p_i$ is a value of a neighboring luma sample, N−1 is a number of taps of the cross-component adaptive loop filter, and $p_c$ is a value of a collocated luma sample.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
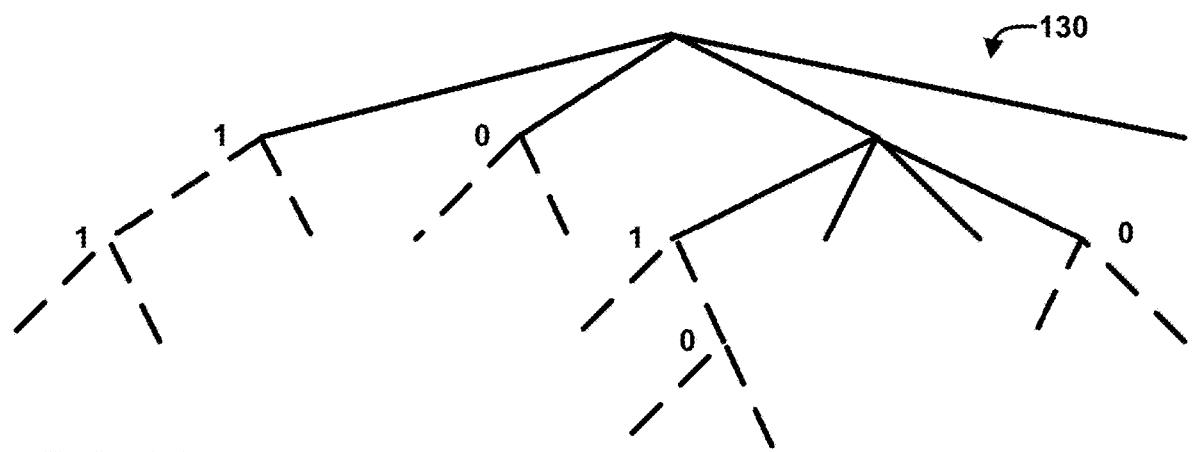
FIGS. 2A and 2B are conceptual diagrams illustrating an example quadtree binary tree (QTBT) structure, and a corresponding coding tree unit (CTU).
Figure 2B:
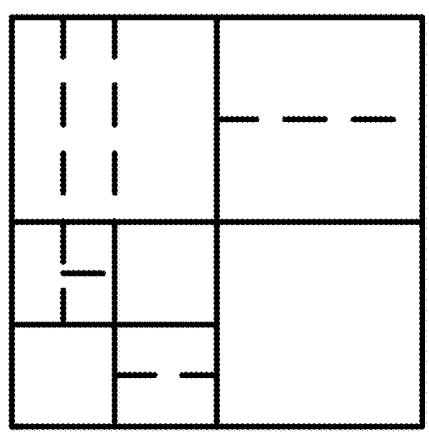

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (Min QTSize, representing a minimum allowed quadtree leaf node size), a maximum binary tree size (Max BTSize, representing a maximum allowed binary tree root node size), a maximum binary tree depth (Max BTDepth, representing a maximum allowed binary tree depth), and a minimum binary tree size (Min BTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (Max BTSize), then the nodes can be further partitioned by respective binary trees. The binary tree splitting of one node can be iterated until the nodes resulting from the split reach the minimum allowed binary tree leaf node size (Min BTSize) or the maximum allowed binary tree depth (Max BTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the Min QTSize is set as 16×16, the Max BTSize is set as 64×64, the Min BTSize (for both width and height) is set as 4, and the Max BTDepth is set as 4. The quadtree partitioning is applied to the CTU first to generate quad-tree leaf nodes. The quadtree leaf nodes may have a size from 16×16 (i.e., the Min QTSize) to 128×128 (i.e., the CTU size). If the leaf quadtree node is 128×128, the leaf quadtree node will not be further split by the binary tree, because the size exceeds the Max BTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches Max BTDepth (4, in this example), no further splitting is permitted. When the binary tree node has a width equal to Min BTSize (4, in this example), it implies no further horizontal splitting is permitted. Similarly, a binary tree node having a height equal to Min BTSize implies no further vertical splitting is permitted for that binary tree node. As noted above, leaf nodes of the binary tree are referred to as CUs, and are further processed according to prediction and transform without further partitioning.

Figure 3:
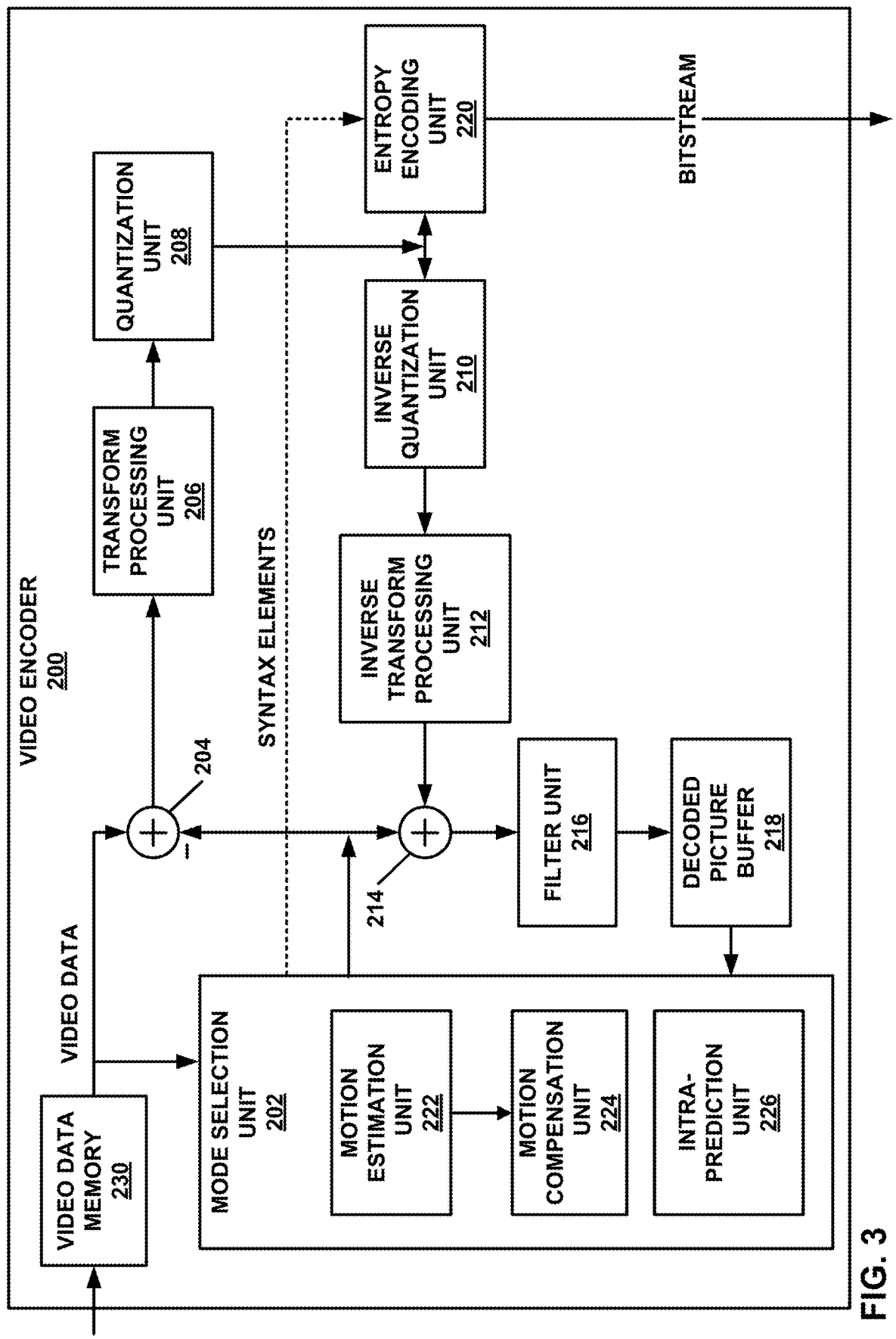
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples. In addition, filter unit 216 may be configured to perform the cross-component adaptive loop filter techniques described below. For example filter unit 216 may be configured to apply a cross-component adaptive loop filter to a reconstructed block of video data, which may include defining and applying an offset according to the equation: $o = \Sigma_{i=0}^{N-1}(f_i * p_i) = \Sigma_{i=0 \text{ and } i \neq c}^{N-1}(f_i * p_i) + f_c * p_c = \Sigma_{i=0 \text{ and } i \neq 0}^{N-1}(f_i * p_i) + f_c * p_c + \Sigma_{i=0 \text{ and } i \neq c}^{N-1}(f_i * p_c) - \Sigma_{i=0 \text{ and } i \neq c}^{N-1}(f_i * p_c) = \Sigma_{i=0 \text{ and } i \neq c}^{N-1}(f_i * (p_i - p_c)) + p_c * \Sigma_{i=0}^{N-1} f_i$, where o is the offset, $f_i$ is a filter coefficient, $p_i$ is a value of a sample of the cross-component adaptive loop filter, N is a number of taps of the cross-component adaptive loop filter, $p_c$ is a value of a collocated luma sample, and $f_c$ is a value of a filter coefficient applied to $p_c$.

In some examples, filter unit 216 may comprise an ALF and a CC-ALF. In addition, in some cases, filter unit 206 may further include an SAO filter. Filter unit 216 may apply the ALF to chroma samples of a reconstructed video block and apply the CC-ALF to the chroma samples. In some examples, SAO filtering may also be performed prior to applying the ALF and the CC-ALF. To apply the cross-component adaptive loop filter, filter unit 216 may be configured to determine an offset, and apply the offset to a particular chroma sample being filtered, wherein the offset is a function of a difference between a collocated luma sample that is collocated with the chroma sample being filtered and a plurality of neighboring luma samples that are spatial neighbors to the collocated luma sample. In some examples, determining and applying the offset may comprise determining and applying the offset according to an equation:

$$o = \sum_{i=0 \text{ and } i \neq c}^{N-1} (f_i * (p_i - p_c))$$

where o defines the offset, $f_i$ is a filter coefficient, $p_i$ is a value of a neighboring luma sample, N–1 is a number of taps of the cross-component adaptive loop filter, and $p_c$ is a value of a collocated luma sample.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma samples of a CU. In some examples, the luma coding block and the chroma coding blocks are luma and chroma samples of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to reconstruct a block of video data. In particular, the one or more processors may apply a cross-component adaptive loop filter to the reconstructed block of video data. Applying the cross-component adaptive loop filter may comprise determining and applying an offset according to the equation: $o = \sum_{i=0}^{N-1} (f_i * p_i) - \sum_{i=0 \text{ and } i \neq c}^{N-1} (f_i * p_i) + f_c * p_c = \sum_{i=0 \text{ and } i \neq 0}^{N-1} (f_i * p_i) + f_c * p_c + \sum_{i=0 \text{ and } i \neq c}^{N-1} (f_i * p_c) - \sum_{i=0 \text{ and } i \neq c}^{N-1} (f_i * p_c) = \sum_{i=0 \text{ and } i \neq c}^{N-1} (f_i * (p_i - p_c)) + p_c * \sum_{i=0}^{N-1} f_i$, where o is the offset, $f_i$ is a filter coefficient, $p_i$ is a value of a sample of the cross-component adaptive loop filter, N is a number of taps of the cross-component adaptive loop filter, $p_c$ is a value of a collocated luma sample, and $f_c$ is a value of a filter coefficient applied to $p_c$.

In some examples, video encoder 200 may be configured to reconstruct a block of video data comprising chroma samples, apply the adaptive loop filter to the chroma samples, and apply the cross-component adaptive loop filter to the chroma samples. To apply the cross-component adaptive loop filter, video encoder 200 may be configured to determine an offset, and apply the offset to a particular chroma sample being filtered, wherein the offset is a function of a difference between a collocated luma sample that is collocated with the chroma sample being filtered and a plurality of neighboring luma samples that are spatial neighbors to the collocated luma sample. In some examples, determining the offset comprises determining the offset according to an equation:

$$o = \sum_{i=0 \text{ and } i \neq c}^{N-1} (f_i * (p_i - p_c))$$

where o defines the offset, $f_i$ is a filter coefficient, $p_i$ is a value of a neighboring luma sample, N–1 is a number of taps of the cross-component adaptive loop filter, and $p_c$ is a value of a collocated luma sample.

Figure 4:
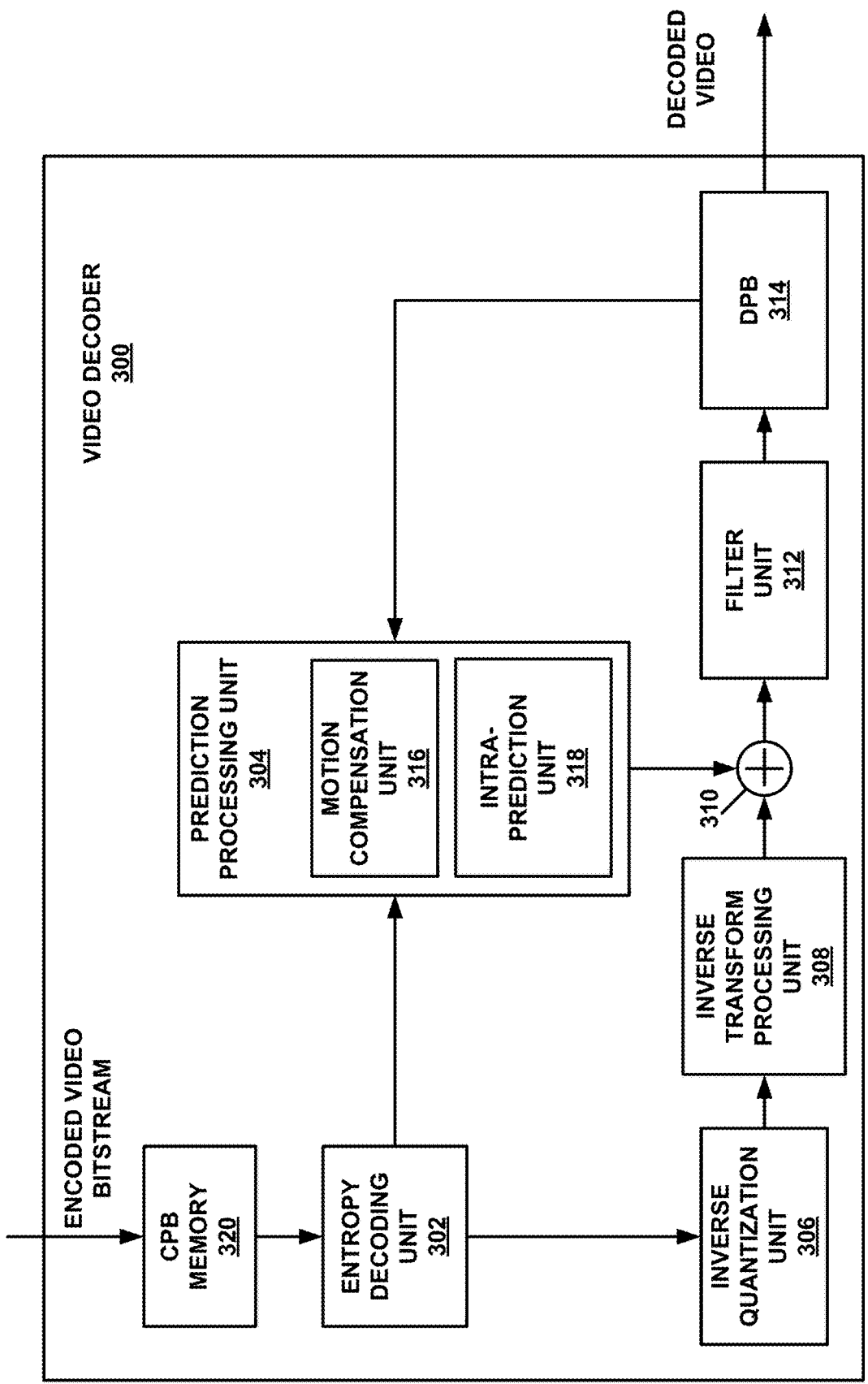
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. The one or more processors may be communicatively coupled to a memory (e.g., memory 120 of FIG. 1) that stores video data being coded (e.g., the data being decoded). Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples. In addition, filter unit 312 may be configured to perform the cross-component adaptive loop filter techniques described below. For example, filter unit 312 may be configured to apply a cross-component adaptive loop filter in order to apply an offset to each chroma sample. The offset may be defined according to the equation: $o = \sum_{i=0}^{N-1}(f_i * p_i) = \sum_{i=0 \text{ and } i \neq c}^{N-1}(f_i * p_i) + f_c * p_c = \sum_{i=0 \text{ and } i \neq 0}^{N-1}(f_i * p_i) + f_c * p_c + \sum_{i=0 \text{ and } i \neq c}^{N-1}(f_i * p_c) - \sum_{i=0 \text{ and } i \neq c}^{N-1}(f_i * p_c) = \sum_{i=0 \text{ and } i \neq c}^{N-1}(f_i * (p_i - p_c)) + p_c * \sum_{i=0}^{N-1} f_i$, where o is the offset, $f_i$ is a filter coefficient, $p_i$ is a value of a sample of the cross-component adaptive loop filter, N is a number of taps of the cross-component adaptive loop filter, $p_c$ is a value of a collocated luma sample, and $f_c$ is a value of a filter coefficient applied to $p_c$.

In some examples, filter unit 312 may comprise an ALF and a CC-ALF. In addition, filter unit 312 may include an SAO filter. Filter unit 206 may apply the ALF to chroma samples of a reconstructed video block and apply the CC-ALF to the chroma samples. SAO filtering may also be performed prior to applying the ALF and the CC-ALF. To apply the cross-component adaptive loop filter, filter unit 312 may be configured to determine an offset, and apply the offset to a particular chroma sample being filtered, wherein the offset is a function of a difference between a collocated luma sample that is collocated with the chroma sample being filtered and a plurality of neighboring luma samples that are spatial neighbors to the collocated luma sample. The offset may be defined and applied for each chroma sample based on the co-located luma sample and neighbors of the co-located luma sample. In some examples, applying the CC-ALF comprises applying an offset that is defined according to an equation:

$$o = \sum_{i=0 \text{ and } i \neq c}^{N-1} (f_i * (p_i - p_c))$$

where o defines the offset, $f_i$ is a filter coefficient, $p_i$ is a value of a neighboring luma sample applied by the CC-ALF, N−1 is a number of taps of the cross-component adaptive loop filter, and $P_c$ is a value of a collocated luma sample.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to reconstruct a block of video data, and apply a cross-component adaptive loop filter to the reconstructed block of video data. In some cases, the offset may be defined according to the equation: $o = \sum_{i=0}^{N-1}(f_i * p_i) = \sum_{i=0 \text{ and } i \neq c}^{N-1}(f_i * p_i) + f_c * p_c = \sum_{i=0 \text{ and } i \neq 0}^{N-1}(f_i * p_i) + f_c * p_c + \sum_{i=0 \text{ and } i \neq c}^{N-1}(f_i * p_c) - \sum_{i=0 \text{ and } i \neq c}^{N-1}(f_i * p_c) = \sum_{i=0 \text{ and } i \neq c}^{N-1}(f_i * (p_i - p_c)) + p_c * \sum_{i=0}^{N-1} f_i$, where o is the offset, $f_i$ is a filter coefficient, $p_i$ is a value of a sample of the cross-component adaptive loop filter, N is a number of taps of the cross-component adaptive loop filter, $p_c$ is a value of a collocated luma sample, and $f_c$ is a value of a filter coefficient applied to $p_c$.

In some examples, video decoder 300 may be configured to reconstruct a block of video data comprising chroma samples, apply the adaptive loop filter to the chroma samples, and apply the cross-component adaptive loop filter to the chroma samples. For each chroma sample, to apply the cross-component adaptive loop filter, video decoder 300 may be configured to determine an offset, and apply the offset to a particular chroma sample being filtered, wherein the offset is a function of a difference between a collocated luma sample that is collocated with the chroma sample being filtered and a plurality of neighboring luma samples that are spatial neighbors to the collocated luma sample. In some examples, determining the offset comprises determining the offset according to an equation:

$$o = \sum_{i=0 \text{ and } i \neq c}^{N-1} (f_i * (p_i - p_c))$$

where o defines the offset, $f_i$ is a filter coefficient, $p_i$ is a value of a neighboring luma sample applied by the cross-component adaptive loop filter, N−1 is a number of taps of the cross-component adaptive loop filter, and $p_c$ is a value of a collocated luma sample.

Figure 5:
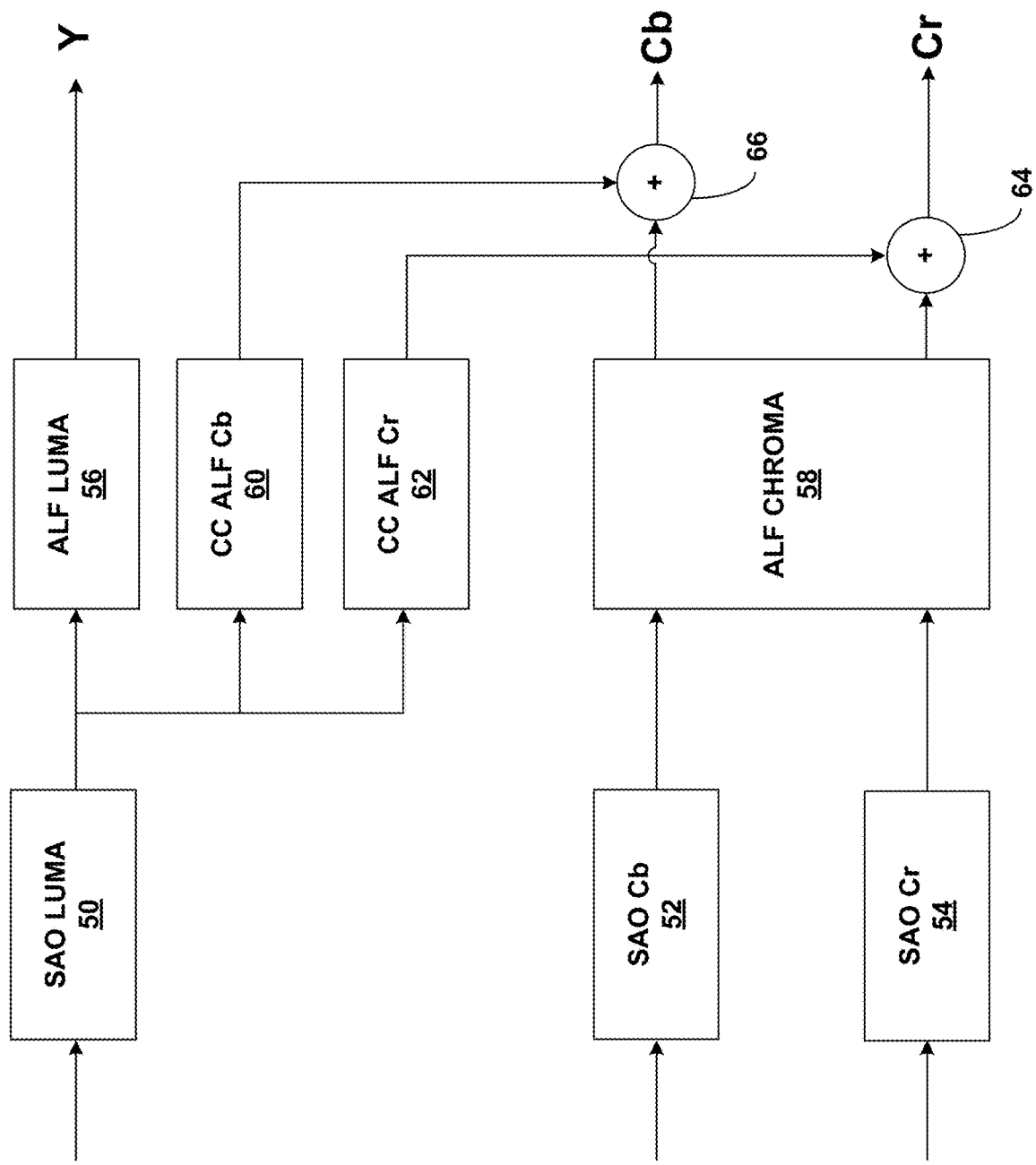
FIG. 5 is a conceptual diagram illustrating an example filter that includes a cross-component adaptive loop filter (CC-ALF) in a reconstruction stage.

In K. Misra, et. al., "Cross-Component Adaptive Loop Filter for chroma," Joint Video Experts Team (WET) of ITU-T SG 16 WP 3 and ISO/IEC JTC 1/SC 29/WG 11, 15th Meeting: Gothenburg, SE, 3-12 Jul. 2019 (hereinafter, "JVET-O0636"), a tool called cross-component adaptive loop filter (CC-ALF) was proposed. CC-ALF may operate as part of an adaptive loop filter (ALF) (e.g., as performed by filter unit 216 of FIG. 3 or filter unit 312 of FIG. 4). The CC-ALF makes used of luma samples to refine each chroma sample. The CC-ALF tool may be controlled by information in the bitstream, and this information may include filter coefficients to determine offsets to apply to each chroma sample (e.g., signaled in an adaptation parameter set (APS)) and a mask controlling the application of the filter for blocks of samples. As shown in FIG. 5, video encoder 200 and/or video decoder 300 may be configured to perform CC-ALF in a reconstruction loop (e.g., performed by filter unit 216 of FIG. 3 or filter unit 312 of FIG. 4).

In JVET-O0636, each filter coefficient is represented as a fixed-point decimal number. To be specific, a filter coefficient uses the lower 10 bits to represent the decimal part. Video encoder 200 may be configured to signal each coefficient with exponential-Golomb (EG) coding, whose order depends on the coefficient position in the filter template.

Figure 6:
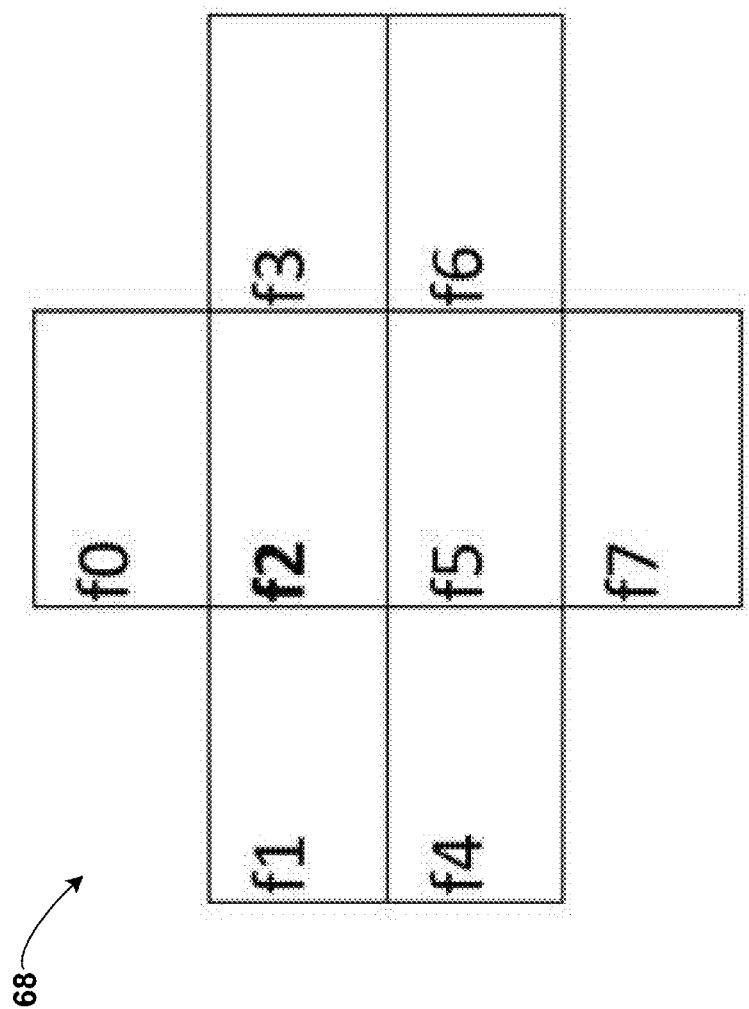
FIG. 6 is conceptual diagram illustrating an example filter shape.
Figure 7:
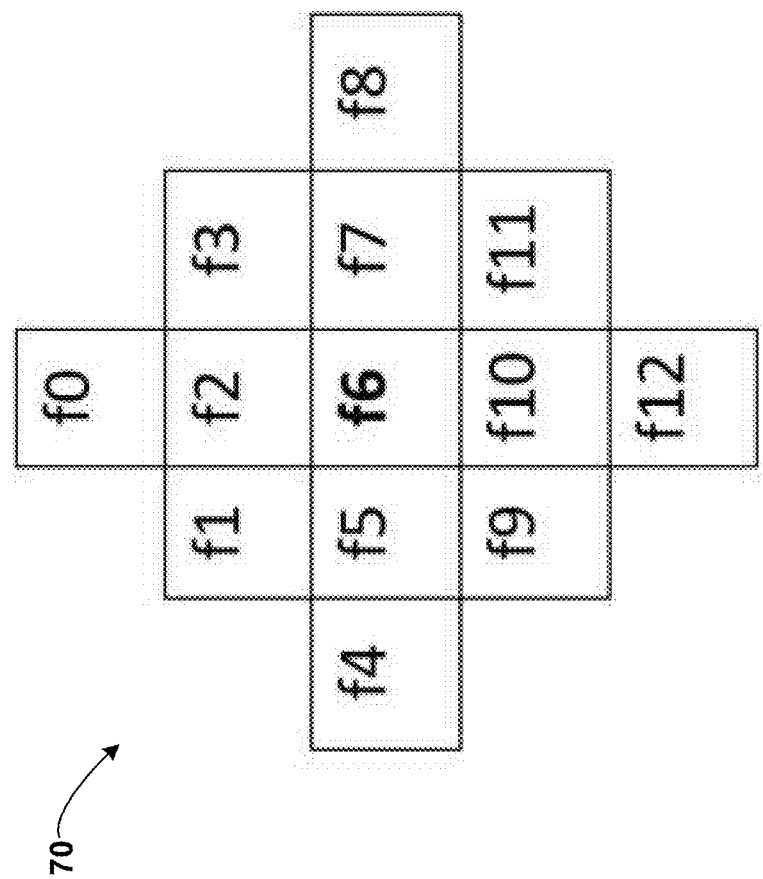
FIG. 7 is conceptual diagram illustrating another example filter shape.

Multiple filter shapes can be used for CC-ALF. For example, a 4×3 filter 68 as shown in FIG. 6 may be used for CC-ALF. Alternatively, a 5×5 filter 70 as shown in FIG. 7 may be used for CC-ALF. These and other filter shapes and sizes may be used for CC-ALF.

When applying CC-ALF to a chroma sample, video encoder 200 and video decoder 300 may use luma samples around the collocated luma sample (e.g., neighboring luma samples) in the way that the collocated luma sample will be in the center of the filter. For example, in the filter shape shown in FIG. 6, video encoder 200 and video decoder 300 may map a collocated luma sample to the position f2 in the filter. In the filter shape shown in FIG. 7, video encoder 200 and video decoder 300 may map a collocated luma sample to the position f6 in the filter.

In some examples, the offset (o) applied by a CC-ALF can be represented as below:

$$o = \sum_{i=0}^{N-1} (f_i * p_i), \quad (1)$$

where $f_i$ is filter coefficient, $p_i$ is the value of a sample, N is the number of taps (or the length) of the filter. A different offset may be determined for each chroma sample, in some cases, the offsets may be different for Cr and Cb samples. In some cases, the filter used to determine the offsets may have different filter coefficients for Cr compared to the filter coefficients used for Cb, and in some cases, Cr and Cb samples may use filters that have similar filter coefficients.

Previous techniques for CC-ALF may be suboptimal in terms of implementation complexity, compression efficiency, and/or video quality. This disclosure describes techniques for CC-ALF that may improve the coding efficiency and reduce the complexity of CC-ALF implementations.

In one example, equation (1) shown above may be reformulated as shown below in equation (2). That is, video encoder 200 and video decoder 300 may be configured to determine the offset (o) of a CC-ALF using the following equation.

$$o = \sum_{i=0}^{N-1}(f_i * p_i) = \sum_{i=0 \text{ and } i \ne c}^{N-1}(f_i * p_i) + f_c * p_c = \\ \sum_{i=0 \text{ and } i \ne c}^{N-1}(f_i * p_i) + f_c * p_c + \sum_{i=0 \text{ and } i \ne c}^{N-1}(f_i * p_c) - \\ \sum_{i=0 \text{ and } i \ne c}^{N-1}(f_i * p_c) = \sum_{i=0 \text{ and } i \ne c}^{N-1} \\ (f_i * (p_i - p_c)) + p_c * \sum_{i=0}^{N-1} f_i, \quad (2)$$

where $p_c$ is the value of the collocated luma sample and $f_c$ is the value of filter coefficient applied to $p_c$. For example, c=2 in FIG. 6 and c=6 in FIG. 7.

In one example of the disclosure, video encoder 200 and video decoder 300 may be configured to apply one or more constraints to the value of $\Sigma_{i=0}^{N-1} f_i$. The constraint may be fixed or signaled at a sequence/picture/slice/sub-picture/APS/filter level.

In another example of the disclosure, let $s=\Sigma_{i=0}^{N-1} f_i$. When signaling filter coefficients $f_i$, i=0 . . . N−1, only N−1 coefficients may be signaled, and the last coefficient may be inferred with these signaled coefficients. Let $f_{j_i}$, $0 \le i \le N-2$, $0 \le j_i \le N-1$ represent those signaled coefficients. Video decoder 300 may infer the coefficient that is not present in the bitstream as $s-\Sigma_{i=0}^{N-2} f_{j_i}$.

When determining the value of the coefficient that is not present in the bitstream as $s-\Sigma_{i=0}^{N-2} f_{j_i}$, video decoder 300 may apply clipping may as:

$$\text{Min}(\max(s-\Sigma_{i=0}^{N-2} f_{j_i}, \text{min\_coeff}), \text{max\_coeff}),$$

where min_coeff is the smallest allowed value of $f_i$, and max_coeff is the largest allowed value of $f_i$.

The information on which filter coefficient is not present in the bitstream may be fixed or signaled in bitstream, such as signaled at the sequence/picture/slice/sub-picture/APS/filter level.

In one example, equation (2) shown above may be reformulated as shown below in equation (3). That is, video encoder 200 and video decoder 300 may be configured to determine the offset (o) of a CC-ALF using the following equation:

$$o = \sum_{i=0 \text{ and } i \ne c}^{N-1}(f_i * (p_i - p_c)) + p_c * s \quad (3)$$

a. In one example, s may be equal to 1, (3) is as $$o = \sum_{i=0 \text{ and } i \ne c}^{N-1}(f_i * (p_i - p_c)) + p_c \quad (4)$$

b. In another example, s may be equal to 0, (3) is as $$o = \sum_{i=0 \text{ and } i \ne c}^{N-1}(f_i * (p_i - p_c)) \quad (5)$$

The example shown in equation 5 may achieve efficiencies in video coding relative to equations 1-4. For example, by eliminating the case where i=c from the summation, the processing can be simplified. Moreover, since the case where i=c is illuminated from the summation in equation 5, this means that any filter coefficient associated with the center position fc (e.g., f2 in FIG. 6 or f6 in FIG. 7) can also be eliminated from the coded bitstream, which can improve compression without any negative impact on video quality. Equation 5 may be derived by imposing the constraint s=0 to equation 3.

As mentioned, FIG. 5 shows one example of a filter that may correspond to filter unit 216 of video encoder 200 or filter unit 312 of video decoder 300. The filter shown in FIG. 5 may be viewed as a combination of filters, e.g., SAO, ALF, and CC-ALF. SAO luma unit 50 performs SAO filtering on luma samples, and SAO Cb unit 52 and SAO Cr unit 54 perform SAO filtering on chroma samples. ALF luma unit 56 performs ALF on the luma samples and ALF chroma unit 58 performs ALF on chroma samples.

Sometimes, chroma samples lack high frequency information that is included in luma samples. Therefore, cross-component adaptive loop filtering may improve video quality by adding high frequency information a particular chroma sample being filtered based on information in luma samples. In particular, co-located luma samples (and spatial neighbors co-located luma samples) may be used to filter chroma samples. To perform CC-ALF, CC-ALF Cb unit 60 and CC-ALF Cr unit 62 may generate offsets that are added to chroma samples via adders 64 and 66, which may be considered part of the CC-ALFs. In this way, offsets to chroma samples can be defined based on luma information. The offset may add high frequency information a particular chroma sample being filtered based on the luma samples that are spatial neighbors to a co-located luma sample that is co-located relative to the chroma sample being filtered.

Chroma samples are often sampled differently than luma samples. The position of "co-located luma sample" of current chroma sample may be determined or calculated based on chroma sub-sample rate and type. For chroma sample position (x, y), for example, when the video sequence is a 4:2:0 sequence, the co-located luma sample may be (2x, 2y). Alternatively, for chroma sample position (x, y), when the sequence is 4:2:2, the co-located luma sample may be (2x, y). In still another example, when the sequence is 4:4:4 (meaning that chroma samples are sampled similarly to luma samples), the collocated luma sample may be (x, y).

The filtering shown in FIG. 5 may be performed by video encoder 200 or video decoder 300 after reconstructing a block of video data. In this case, the video data may include chroma samples. According to this disclosure, ALF chroma unit 58 may comprise an ALF applied to the chroma samples. CC-ALF Cb unit 60 and CC-ALF Cr unit 62 may comprise a cross-component adaptive loop filter that determines the offsets to be applied to each of the samples of the blocks of chroma samples. In particular, CC-ALF Cb unit 60 and CC-ALF Cr unit 62 may generate offsets that are added to the chroma samples via adders 66 and 64. According to this disclosure, applying a CC-ALF filter may include determining an offset (via CC ALF Cb unit 60 or via CC ALF Cr unit 62) and applying the offset to a particular chroma sample being filtered (via adder 66 or via adder 64). Moreover, according to this disclosure, the offset may be defined as a function of a difference between a collocated luma sample that is collocated with the particular chroma sample being filtered and a plurality of neighboring luma samples that are spatial neighbors to the collocated luma sample.

In some examples, CC ALF Cb unit 60 and CC ALF Cr unit 62 may define offsets according to the equation:

$$o = \sum_{i=0 \text{ and } i \neq c}^{N-1} (f_i * (p_i - p_c))$$

where o defines the offset, $f_i$ is a filter coefficient, $p_i$ is a value of a neighboring luma sample, N−1 is a number of taps of the cross-component adaptive loop filter, and $p_c$ is a value of a collocated luma sample. This corresponds to equation 5 above, which may achieve efficiencies in video coding. For example, by eliminating the case where i=c from the summation, the processing can be simplified. Moreover, since the case where i=c is illuminated from the summation in equation 5, this means that any filter coefficient associated with the center position fc (e.g., f2 in FIG. 6 or f6 in FIG. 7) can also be eliminated from the coded bitstream, which can improve compression without any negative impact on video quality. Again, equation 5 may be derived by imposing the constraint s=0 to equation 3. Applying the offset for CC ALF may comprise adding the determined offset to the particular chroma sample being filtered.

Since the filter coefficient associated with the center position fc (e.g., f2 in FIG. 6 or f6 in FIG. 7) can also be eliminated from the coded bitstream, in some examples, a video decoding device may be configured to receive N−1 filter coefficients as part of an encoded bitstream, wherein the N−1 filter coefficients include coefficients associated with the plurality of neighboring luma samples that are spatial neighbors to the collocated luma sample and wherein the N−1 filter coefficients do not include any coefficients associated with the co-located luma sample.

In some examples, a video decoding device (e.g., video decoder 300) may be configured to receive N−1 filter coefficients as part of an encoded bitstream, and the video decoding device may infer a value of at least one filter coefficient of the cross-component adaptive loop filter. For example, inferring the value may comprise inferring a filter coefficient associated with the co-located luma sample (which may be desirable for other filtering even if this filter coefficient is not used according to equation 3).

As examples, the cross-component adaptive loop filter may define a filter shape as shown in FIG. 6 or FIG. 7, although other filter shapes could also be used. The filter shown in FIG. 6 may comprise a 4×3 filter where f2 corresponds to the "center" location that also corresponds to the location of the sample being filtered. The filter shown in FIG. 7 may comprise a 5×5 filter where f6 corresponds to the "center" location that also corresponds to the location of the sample being filtered. These or other filter shapes or sizes could be used according to this disclosure.

As mentioned, in some cases, SAO filtering may be performed in addition to ALF and CC-ALF. In some cases, SAO filtering may be applied to the chroma samples prior to applying the cross-component adaptive loop filter. FIG. 5 also shows this feature whereby SAO Cb unit 52 and SAO Cr unit 54 perform SAO filtering on chroma samples before ALF filtering is performed on the chroma samples by ALF chroma unit 58 and before CC-ALF filtering is performed on the chroma samples by CC ALF Cb unit 60 and adder 66 and by CC ALF Cr unit 62 and adder 64.

Figure 8:
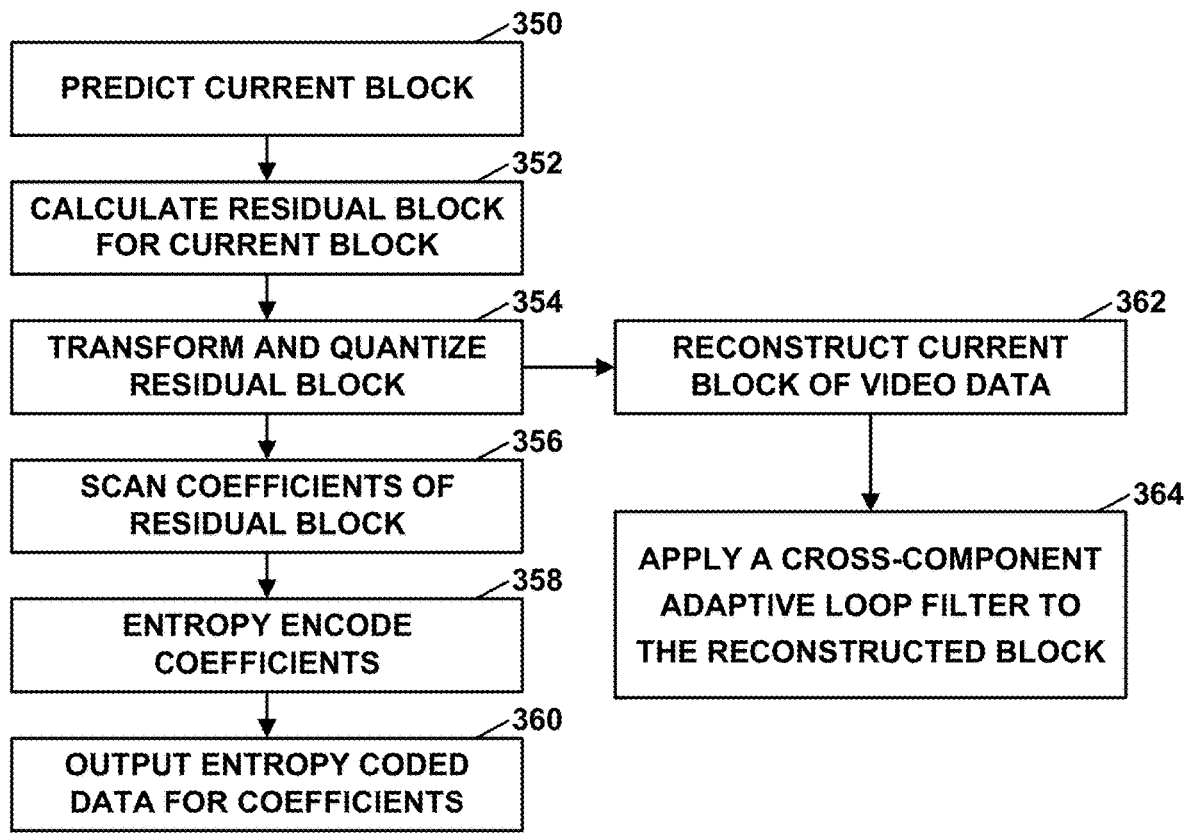
FIG. 8 is a flowchart illustrating an example encoding method.

FIG. 8 is a flowchart illustrating an example method for encoding a current block. The current block may comprise a current CU. Although described with respect to video encoder 200 (FIGS. 1 and 3), it should be understood that other devices may be configured to perform a method similar to that of FIG. 8.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

After transforming and quantizing the residual block, video encoder 200 may reconstruct the current block of video data (362). Video encoder 200 may then apply a cross-component adaptive loop filter to the reconstructed block (364), for example, using an offset defined equation (1), (2), (3), (4), or (5) above. As explained above, equation (5) may have advantages for defining the offset relative to the other equations. Again, equation 5 may be derived by imposing the constraint s=0 to equation 3. This may possibly reduce the number of filter coefficients needed to perform the cross-component adaptive loop filtering process by avoiding the need to send a filter coefficient associated with the center location. Thus, in some examples, by using equation 5 for the CC-ALF process, the techniques may also improve compression by eliminating the need to communicate one or more filter coefficients in the coded bitstream.

Figure 9:
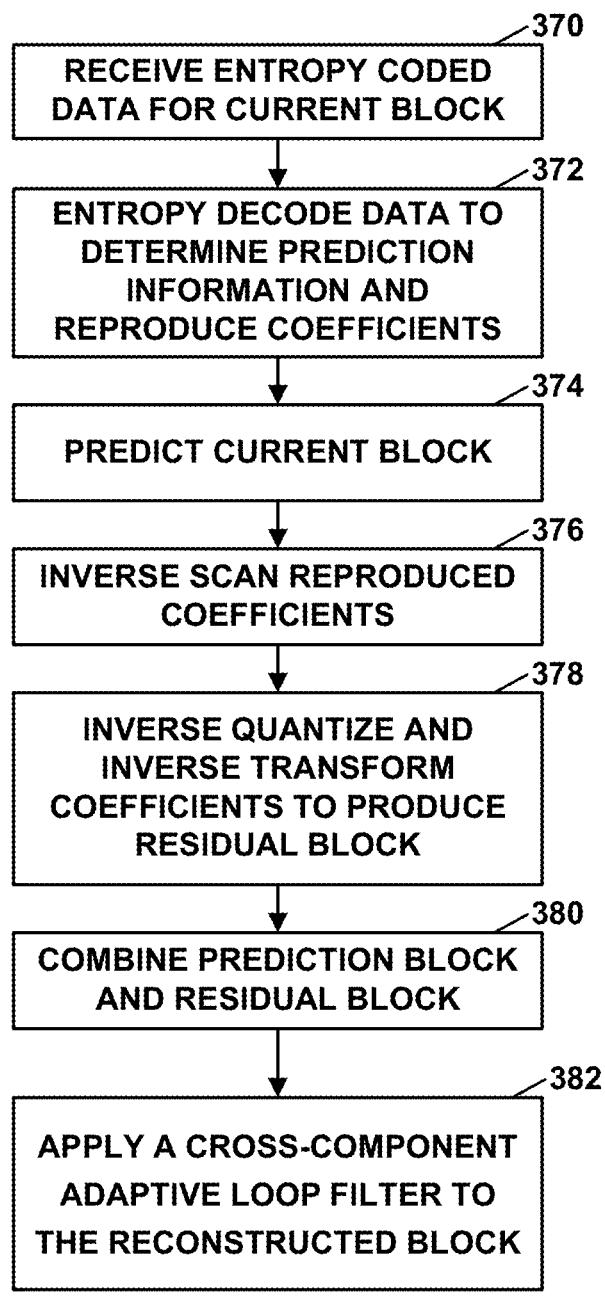
FIG. 9 is a flowchart illustrating an example decoding method.

FIG. 9 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 9.

Video decoder 300 may receive entropy encoded data for the current block, such as entropy encoded prediction information and entropy encoded data for coefficients of a residual block corresponding to the current block (370). Video decoder 300 may entropy decode the entropy encoded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the transform coefficients to produce a residual block (378). Video decoder 300 may ultimately decode the current block by combining the prediction block and the residual block (380).

After decoding (e.g., reconstructing) the block of video data, video decoder 300 may then apply a cross-component adaptive loop filter to the reconstructed block (382), for example, defining and applying an offset according to equation (1), (2), (3), (4), or (5) above. Again, equation (5) may have advantages for defining the offset relative to the other equations, and equation 5 may be derived by imposing the constraint s=0 to equation 3. Using equation 5 for the CC-ALF process may possibly reduce the number of filter coefficients needed to perform the cross-component adaptive loop filtering process by avoiding the need to send a filter coefficient associated with the center location. Thus, in some examples, by using equation 5 for the CC-ALF process, the techniques may also improve compression by eliminating the need to communicate one or more filter coefficients in the coded bitstream.

Figure 10:
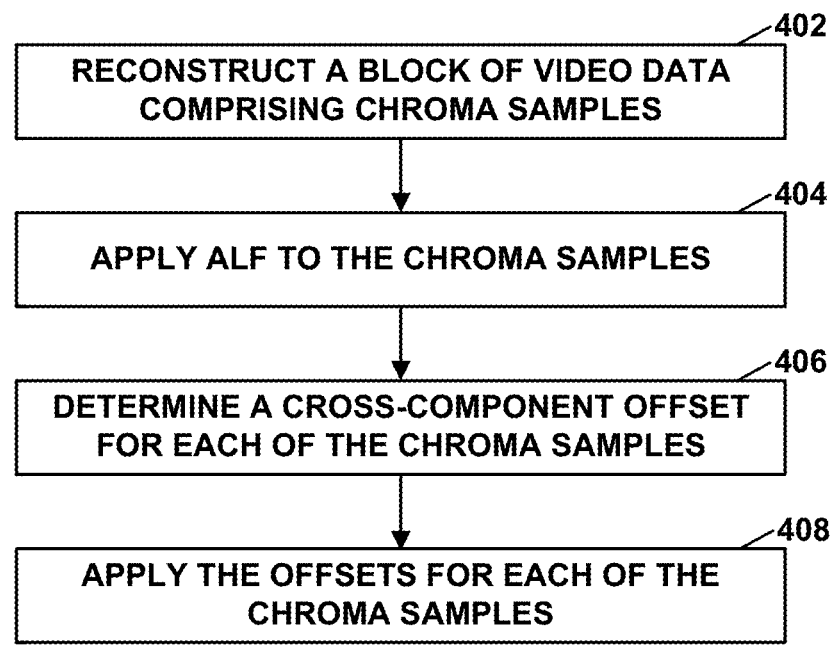
FIG. 10 is a flow chart illustrating an example filtering process using a CC-ALF according to this disclosure.

FIG. 10 is a flow chart illustrating an example filtering process using a CC-ALF according to this disclosure. Although described with respect to video decoder 300 (FIGS. 1 and 4), it should be understood that other devices may be configured to perform a method similar to that of FIG. 9. For example, a video encoder (FIGS. 1 and 3) could also perform the techniques as part of a reconstruction loop of an encoding process.

As shown in FIG. 10, video decoder 300 reconstructs a block of video data comprising chroma samples (402). Video decoder 300 applies adaptive loop filtering (ALF) to the chroma samples (403), and in some cases other filtering (such as SAO filtering) may be performed on the chroma samples). According to this disclosure, video decoder 300 performs cross-component filtering. In particular, video decoder 300 may determine a cross-component offset for each of the chroma samples in the block of video data (406) and may apply the offsets for each of the chroma samples (408). The offsets may be defined as described herein, such as according to the equation:

$$o = \sum_{\substack{i=0 \\ and\ i \neq c}}^{N-1} (f_i * (p_i - p_c))$$

where o defines the offset, $f_i$ is a filter coefficient, $p_i$ is a value of a neighboring luma sample, N−1 is a number of taps of the cross-component adaptive loop filter, and $p_c$ is a value of a collocated luma sample. This corresponds to equation 5 above, which may achieve efficiencies in video coding.

The following clauses may demonstrate one or more aspects of this disclosure:

Clause 1—A method of decoding video data, the method comprising: reconstructing a block of video data comprising chroma samples; applying an adaptive loop filter to the chroma samples; and applying a cross-component adaptive loop filter to the chroma samples, wherein applying the cross-component adaptive loop filter includes: determining an offset; and applying the offset to a particular chroma sample being filtered, wherein the offset is a function of a difference between a collocated luma sample that is collocated with the particular chroma sample being filtered and a plurality of neighboring luma samples that are spatial neighbors to the collocated luma sample.

Clause 2—The method of clause 1, wherein determining the offset comprises determining the offset according to an equation:

$$o = \sum_{\substack{i=0 \\ and\ i \neq c}}^{N-1} (f_i * (p_i - p_c))$$

where o defines the offset, $f_i$ is a filter coefficient, $p_i$ is a value of a neighboring luma sample, N−1 is a number of taps of the cross-component adaptive loop filter, and $p_c$ is a value of the collocated luma sample.

Clause 3—The method of clause 1 or 2, further comprising: receiving N−1 filter coefficients as part of an encoded bitstream, wherein the N−1 filter coefficients include filter coefficients associated with the plurality of neighboring luma samples that are spatial neighbors to the collocated luma sample and wherein the N−1 filter coefficients do not include any coefficients associated with the co-located luma sample.

Clause 4—The method of any of clauses 1-3, wherein applying the cross-component adaptive loop filter comprises applying a 4×3 filter.

Clause 5—The method of any of clauses 1-4, further comprising: receiving N−1 filter coefficients as part of an encoded bitstream; and inferring a value of at least one filter coefficient of the cross-component adaptive loop filter.

Clause 6—The method of clause 5, wherein inferring the value comprises inferring a filter coefficient associated with the co-located luma sample.

Clause 7—The method of any of clauses 1-6, further comprising: applying sample adaptive offset (SAO) filtering to the chroma samples prior to applying the cross-component adaptive loop filter.

Clause 8—The method of any of clauses 1-7, wherein the offset adds high frequency information the particular chroma sample being filtered based on the luma samples that are spatial neighbors to the co-located luma sample.

Clause 9—The method of any of clauses 1-8, wherein the method is performed by a video decoder.

Clause 10—The method of any of clauses 1-8, wherein the method is performed by a video encoder as part of a reconstruction loop of an encoding process.

Clause 11—The method of any of clauses 1-10, wherein applying the offset comprises adding the determined offset to the particular chroma sample being filtered.

Clause 12—A device configured to decode video data, the device comprising: a memory configured to store video data; one or more processors implemented in circuitry and in communication with the memory; an adaptive loop filter; and a cross-component adaptive loop filter, wherein the one or more processors are configured to: reconstruct a block of video data comprising chroma samples; apply the adaptive loop filter to the chroma samples; and apply the cross-component adaptive loop filter to the chroma samples, wherein to apply the cross-component adaptive loop filter, the one or more processors are configured to: determine an offset; and apply the offset to a particular chroma sample being filtered, wherein the offset is a function of a difference between a collocated luma sample that is collocated with the chroma sample being filtered and a plurality of neighboring luma samples that are spatial neighbors to the collocated luma sample.

Clause 13—The device of clause 12, wherein to determine the offset, the one or more processors are configured to determine the offset according to an equation:

$$o = \sum_{i=0 \text{ and } i \neq c}^{N-1} (f_i * (p_i - p_c))$$

where o defines the offset, $f_i$ is a filter coefficient, $p_i$ is a value of a neighboring luma sample, N−1 is a number of taps of the cross-component adaptive loop filter, and $p_c$ is a value of the collocated luma sample.

Clause 14—The device of clause 12 or 13, wherein the one or more processors are configured to receive N−1 filter coefficients as part of an encoded bitstream, wherein the N−1 filter coefficients include filter coefficients associated with the plurality of neighboring luma samples that are spatial neighbors to the collocated luma sample and wherein the N−1 filter coefficients do not include any coefficients associated with the co-located luma sample.

Clause 15—The device of any of clauses 12-14, wherein to apply the cross-component adaptive loop filter, the one or more processors are configured to apply a 4×3 filter.

Clause 16—The device of any of clauses 12-15, wherein the one or more processors are configured to: receive N−1 filter coefficients as part of an encoded bitstream; and infer a value of at least one filter coefficient of the cross-component adaptive loop filter.

Clause 17—The device of clause 16, wherein the one or more processors are configured to infer a filter coefficient associated with the co-located luma sample.

Clause 18—The device of any of clauses 12-17, further comprising a sample adaptive offset (SAO) filter, wherein the one or more processors are configured to: apply the SAO filter to the chroma samples prior to applying the cross-component adaptive loop filter.

Clause 19—The device of any of clauses 12-18, wherein the offset adds high frequency information the particular chroma sample being filtered based on the luma samples that are spatial neighbors to the co-located luma sample.

Clause 20—The device of any of clauses 12-19, wherein the device comprises a video decoder device that includes a display configured to display the decoded video data including the filtered chroma samples.

Clause 21—The device of any of clauses 12-19, wherein the device comprises a video encoder device that is configured to apply the cross-component adaptive loop filter as part of a reconstruction loop of an encoding process.

Clause 22—The device of any of clauses 12-20, wherein in applying the offset to a particular chroma sample being filtered, the one or more processors are configured to add the determined offset to the particular chroma sample being filtered.

Clause 23—A device for decoding video data comprising: means for reconstructing a block of video data comprising chroma samples; means for applying an adaptive loop filter to the chroma samples; and means for applying a cross-component adaptive loop filter to the chroma samples, wherein means for applying the cross-component adaptive loop filter includes: means for determining an offset; and means for applying the offset to a particular chroma sample being filtered, wherein the offset is a function of a difference between a collocated luma sample that is collocated with the particular chroma sample being filtered and a plurality of neighboring luma samples that are spatial neighbors to the collocated luma sample.

Clause 24—The device of clause 23, wherein means for determining the offset comprises means for determining the offset according to an equation:

$$o = \sum_{i=0 \text{ and } i \neq c}^{N-1} (f_i * (p_i - p_c))$$

where o defines the offset, $f_i$ is a filter coefficient, $p_i$ is a value of a neighboring luma sample, N−1 is a number of taps of the cross-component adaptive loop filter, and $p_c$ is a value of the collocated luma sample.

Clause 25—A computer-readable storage medium storing instructions that, when executed, cause one or more processors of a video decoding device to: reconstruct a block of video data comprising chroma samples; apply an adaptive loop filter to the chroma samples; and apply a cross-component adaptive loop filter to the chroma samples, wherein to apply the cross-component adaptive loop filter, the instructions are configured to cause the one or more processors to: determine an offset; and apply the offset to a particular chroma sample being filtered, wherein the offset is a function of a difference between a collocated luma sample that is collocated with the particular chroma sample being filtered and a plurality of neighboring luma samples that are spatial neighbors to the collocated luma sample.

Clause 26—The computer-readable medium of clause 25, wherein to determine the offset, the instructions cause the one or more processors to determine the offset according to an equation:

$$o = \sum_{i=0 \text{ and } i \neq c}^{N-1} (f_i * (p_i - p_c))$$

where o defines the offset, $f_i$ is a filter coefficient, $p_i$ is a value of a neighboring luma sample, N−1 is a number of taps of the cross-component adaptive loop filter, and $p_c$ is a value of a collocated luma sample.

Clause 27—A method of coding video data, the method comprising: reconstructing a block of video data; and applying a cross-component adaptive loop filter to the reconstructed block of video data according to the equation:

$$o = \sum_{i=0}^{N-1}(f_i * p_i) = \sum_{i=0 \text{ and } i \neq c}^{N-1}(f_i * p_i) + f_c * p_c =$$
$$\sum_{i=0 \text{ and } i \neq c}^{N-1}(f_i * p_i) + f_c * p_c + \sum_{i=0 \text{ and } i \neq c}^{N-1}(f_i * p_c) -$$
$$\sum_{i=0 \text{ and } i \neq c}^{N-1}(f_i * p_c) = \sum_{i=0 \text{ and } i \neq c}^{N-1}(f_i * (p_i - p_c)) + p_c * \sum_{i=0}^{N-1} f_i,$$

where o is an offset applied by the cross-component adaptive loop filter, $f_i$ is a filter coefficient, $p_i$ is a value of a sample of the cross-component adaptive loop filter, N is a number of taps of the cross-component adaptive loop filter, $p_c$ is a value of a collocated luma sample, and $f_c$ is a value of a filter coefficient applied to $p_c$.

Clause 28—The method of clause 27, wherein the cross-component adaptive loop filter is a 4×3 filter.

Clause 29—The method of clause 28, wherein c equals 2.

Clause 30—The method of clause 27, wherein the cross-component adaptive loop filter is a 5×5 filter.

Clause 31—The method of clause 30, wherein c equals 6.

Clause 32—The method of clause 27, further comprising: constraining a value of $\sum_{i=0}^{N-1} f_i$.

Clause 33—The method of clause 27, further comprising: inferring a value of at least one filter coefficient of the cross-component adaptive loop filter.

Clause 34—A method of coding video data, the method comprising: reconstructing a block of video data; and applying a cross-component adaptive loop filter to the reconstructed block of video data according to the equation:

$$o = \sum_{\substack{i=0 \text{ and } i \neq c}}^{N-1}(f_i * (p_i - p_c)) + p_c * s$$

where o is an offset applied by the cross-component adaptive loop filter, $f_i$ is a filter coefficient, $p_i$ is a value of a sample of the cross-component adaptive loop filter, N is a number of taps of the cross-component adaptive loop filter, and $p_c$ is a value of a collocated luma sample $p_c$.

Clause 35—The method of clause 34, wherein s equals 1.

Clause 36—The method of clause 34, wherein s equals 0.

Clause 37—The method of any of clauses 27-36, wherein coding comprises decoding.

Clause 38—The method of any of clauses 27-36, wherein coding comprises encoding.

Clause 39—A device for coding video data, the device comprising one or more means for performing the method of any of clauses 27-38.

Clause 40—The device of clause 39, wherein the one or more means comprise one or more processors implemented in circuitry.

Clause 41—The device of clause 39 or 40, further comprising a memory to store the video data.

Clause 42—The device of any of clauses 39-41, further comprising a display configured to display decoded video data.

Clause 43—The device of any of clauses 39-42, wherein the device comprises one or more of a camera, a computer, a mobile device, a broadcast receiver device, or a set-top box.

Clause 44—The device of any of clauses 39-43, wherein the device comprises a video decoder.

Clause 45—The device of any of clauses 39-43, wherein the device comprises a video encoder.

Clause 46—A computer-readable storage medium having stored thereon instructions that, when executed, cause one or more processors to perform the method of any of clauses 27-36.

Clause 47—Any combination of techniques described in this disclosure.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
reconstructing a block of video data comprising chroma samples;
applying an adaptive loop filter to the chroma samples; and
applying a cross-component adaptive loop filter to the chroma samples,
wherein applying the cross-component adaptive loop filter includes:
determining an offset; and
applying the offset to a particular chroma sample being filtered, wherein the offset is a function of a difference between a collocated luma sample that is collocated with the particular chroma sample being filtered and a plurality of neighboring luma samples that are spatial neighbors to the collocated luma sample, wherein determining the offset comprises determining the offset according to an equation:

$$o = \sum_{i=0 \text{ and } i \neq c}^{N-1} (f_i * (p_i - p_c))$$

where o defines the offset, $f_i$ is a filter coefficient, $p_i$ is a value of a neighboring luma sample, N−1 is a number of taps of the cross-component adaptive loop filter, and $p_c$ is a value of the collocated luma sample.

2. The method of claim 1, further comprising:
receiving N−1 filter coefficients as part of an encoded bitstream, wherein the N−1 filter coefficients include filter coefficients associated with the plurality of neighboring luma samples that are spatial neighbors to the collocated luma sample and wherein the N−1 filter coefficients do not include any coefficients associated with the co-located luma sample.

3. The method of claim 1, wherein applying the cross-component adaptive loop filter comprises applying a 4×3 filter.

4. The method of claim 1, further comprising:
receiving N−1 filter coefficients as part of an encoded bitstream; and
inferring a value of at least one filter coefficient of the cross-component adaptive loop filter.

5. The method of claim 4, wherein inferring the value comprises inferring a filter coefficient associated with the co-located luma sample.

6. The method of claim 1, further comprising:
applying sample adaptive offset (SAO) filtering to the chroma samples prior to applying the cross-component adaptive loop filter.

7. The method of claim 1, wherein the offset adds high frequency information the particular chroma sample being filtered based on the luma samples that are spatial neighbors to the co-located luma sample.

8. The method of claim 1, wherein the method is performed by a video decoder.

9. The method of claim 1, wherein the method is performed by a video encoder as part of a reconstruction loop of an encoding process.

10. The method of claim 1, wherein applying the offset comprises adding the determined offset to the particular chroma sample being filtered.

11. A device configured to decode video data, the device comprising:
a memory configured to store video data;
one or more processors implemented in circuitry and in communication with the memory;
an adaptive loop filter;
and a cross-component adaptive loop filter, wherein the one or more processors are configured to:
reconstruct a block of video data comprising chroma samples;
apply the adaptive loop filter to the chroma samples; and
apply the cross-component adaptive loop filter to the chroma samples,
wherein to apply the cross-component adaptive loop filter, the one or more processors are configured to:
determine an offset; and
apply the offset to a particular chroma sample being filtered, wherein the offset is a function of a difference between a collocated luma sample that is collocated with the chroma sample being filtered and a plurality of neighboring luma samples that are spatial neighbors to the collocated luma sample, wherein to determine the offset, the one or more processors are configured to determine the offset according to an equation:

$$o = \sum_{i=0 \text{ and } i \neq c}^{N-1} (f_i * (p_i - p_c))$$

where o defines the offset, $f_i$ is a filter coefficient, $p_i$ is a value of a neighboring luma sample, N−1 is a number of taps of the cross-component adaptive loop filter, and $p_c$ is a value of the collocated luma sample.

12. The device of claim 11, wherein the one or more processors are configured to receive N−1 filter coefficients as part of an encoded bitstream, wherein the N−1 filter coefficients include filter coefficients associated with the plurality of neighboring luma samples that are spatial neighbors to the collocated luma sample and wherein the N−1 filter coefficients do not include any coefficients associated with the co-located luma sample.

13. The device of claim 11, wherein to apply the cross-component adaptive loop filter, the one or more processors are configured to apply a 4×3 filter.

14. The device of claim 11, wherein the one or more processors are configured to:
receive N−1 filter coefficients as part of an encoded bitstream; and
infer a value of at least one filter coefficient of the cross-component adaptive loop filter.

15. The device of claim 14, wherein the one or more processors are configured to infer a filter coefficient associated with the co-located luma sample.

16. The device of claim 11, further comprising a sample adaptive offset (SAO) filter, wherein the one or more processors are configured to:
apply the SAO filter to the chroma samples prior to applying the cross-component adaptive loop filter.

17. The device of claim 11, wherein the offset adds high frequency information the particular chroma sample being filtered based on the luma samples that are spatial neighbors to the co-located luma sample.

18. The device of claim 11, wherein the device comprises a video decoder device that includes a display configured to display the decoded video data including the filtered chroma samples.

19. The device of claim 11, wherein the device comprises a video encoder device that is configured to apply the cross-component adaptive loop filter as part of a reconstruction loop of an encoding process.

20. The device of claim 11, wherein in applying the offset to a particular chroma sample being filtered, the one or more processors are configured to add the determined offset to the particular chroma sample being filtered.

21. A device for decoding video data comprising:
means for reconstructing a block of video data comprising chroma samples;
means for applying an adaptive loop filter to the chroma samples; and
means for applying a cross-component adaptive loop filter to the chroma samples,
wherein means for applying the cross-component adaptive loop filter includes:
means for determining an offset; and
means for applying the offset to a particular chroma sample being filtered, wherein the offset is a function of a difference between a collocated luma sample that is collocated with the particular chroma sample being filtered and a plurality of neighboring luma samples that are spatial neighbors to the collocated luma sample, wherein means for determining the offset comprises means for determining the offset according to an equation:

$$o = \sum_{\substack{i=0 \text{ and } i \neq c}}^{N-1} (f_i * (p_i - p_c))$$

where o defines the offset, $f_i$ is a filter coefficient, $p_i$ is a value of a neighboring luma sample, N−1 is a number of taps of the cross-component adaptive loop filter, and $p_c$ is a value of the collocated luma sample.

22. A computer-readable storage medium storing instructions that, when executed, cause one or more processors of a video decoding device to:
reconstruct a block of video data comprising chroma samples;
apply an adaptive loop filter to the chroma samples; and
apply a cross-component adaptive loop filter to the chroma samples,
wherein to apply the cross-component adaptive loop filter, the instructions are configured to cause the one or more processors to:
determine an offset; and
apply the offset to a particular chroma sample being filtered, wherein the offset is a function of a difference between a collocated luma sample that is collocated with the particular chroma sample being filtered and a plurality of neighboring luma samples that are spatial neighbors to the collocated luma sample, wherein to determine the offset, the instructions cause the one or more processors to determine the offset according to an equation:

$$o = \sum_{\substack{i=0 \text{ and } i \neq c}}^{N-1} (f_i * (p_i - p_c))$$

where o defines the offset, $f_i$ is a filter coefficient, $p_i$ is a value of a neighboring luma sample, N−1 is a number of taps of the cross-component adaptive loop filter, and $p_c$ is a value of the collocated luma sample.

* * * * *